United States Patent
Wiley et al.

(10) Patent No.: US 9,554,420 B2
(45) Date of Patent: Jan. 24, 2017

(54) PARTIAL VACUUM OPERATION OF ARC DISCHARGE FOR CONTROLLED HEATING

(71) Applicant: 3SAE Technologies, Inc., Franklin, TN (US)

(72) Inventors: Robert G. Wiley, Franklin, TN (US); Brett Clark, Whites Creek, TX (US); John Lower, Franklin, TN (US); Jason Troyer, Shelbyville, TN (US); Clyde J. Troutman, Spring Hill, TN (US)

(73) Assignee: 3SAE Technologies, Inc., Franklin, TN (US)

( * ) Notice: Subject to any disclaimer, the term of this patent is extended or adjusted under 35 U.S.C. 154(b) by 283 days.

(21) Appl. No.: 14/388,292

(22) PCT Filed: Apr. 8, 2013

(86) PCT No.: PCT/US2013/035665
§ 371 (c)(1),
(2) Date: Sep. 26, 2014

(87) PCT Pub. No.: WO2014/011270
PCT Pub. Date: Jan. 16, 2014

(65) Prior Publication Data
US 2015/0040615 A1    Feb. 12, 2015

Related U.S. Application Data

(60) Provisional application No. 61/621,274, filed on Apr. 6, 2012.

(51) Int. Cl.
*H05B 1/02* (2006.01)
*C03B 37/15* (2006.01)
(Continued)

(52) U.S. Cl.
CPC ............. *H05B 1/023* (2013.01); *C03B 37/07* (2013.01); *C03B 37/10* (2013.01); *C03B 37/15* (2013.01); *G02B 6/2551* (2013.01); *G02B 6/2553* (2013.01); *G02B 6/2552* (2013.01)

(58) Field of Classification Search
CPC ... G02B 6/2251; G02B 6/2552; G02B 6/2553; G02B 6/2555–6/2557; H05B 1/023; C03B 37/07; C03B 37/10; C03B 37/15
(Continued)

(56) References Cited

U.S. PATENT DOCUMENTS

| 7,670,065 B2 * | 3/2010 | Clark | G02B 6/245 |
| | | | 219/121.36 |
| 2006/0263016 A1 * | 11/2006 | Wiley | G02B 6/2553 |
| | | | 385/96 |
| 2008/0187273 A1 | 8/2008 | Clark et al. | |

FOREIGN PATENT DOCUMENTS

| DE | 3724914 | 2/1989 |
| JP | H05333227 | 12/1993 |

(Continued)

OTHER PUBLICATIONS

European Search Report dated Dec. 13, 2015 in related European application No. 13817577.3.
(Continued)

*Primary Examiner* — Akm Enayet Ullah
*Assistant Examiner* — Michael Mooney
(74) *Attorney, Agent, or Firm* — Onello & Mello, LLP.

(57) ABSTRACT

An electrical discharge, suitable for heating optical fibers for processing, is made in a controlled partial vacuum, such that saturation of available ionizable gas molecules is reached. The workpiece temperature is thereby made to be a stably controlled function of the absolute air pressure and is
(Continued)

insensitive to other conditions. A system and method accomplishing the foregoing are provided.

27 Claims, 3 Drawing Sheets

(51) Int. Cl.
*C03B 37/10* (2006.01)
*C03B 37/07* (2006.01)
*G02B 6/255* (2006.01)

(58) Field of Classification Search
USPC ...... 385/95–99; 65/391, 407, 483, 489, 495, 65/501, 529; 219/209, 383, 483, 486, 494, 219/496, 497
See application file for complete search history.

(56) References Cited

FOREIGN PATENT DOCUMENTS

| | | |
|---|---|---|
| JP | 2002022898 | 1/2002 |
| JP | 2005263523 | 9/2005 |
| JP | 2010054689 | 3/2010 |

OTHER PUBLICATIONS

International Search Report and Written Opinion dated Jan. 20, 2014 issued in International Application No. PCT/US2013/035665.

* cited by examiner

PARTIAL VACUUM OPERATION OF ARC DISCHARGE FOR CONTROLLED HEATING

CROSS-REFERENCE TO RELATED APPLICATIONS

The present application claims priority under 35 USC 119(e) from U.S. Provisional Patent Application 61/621,274 filed Apr. 6, 2012, entitled PARTIAL VACUUM OPERATION OF ARC DISCHARGE FOR CONTROLLED HEATING, the disclosure of which is incorporated herein in its entirety by reference.

FIELD OF INTEREST

The present inventive concepts relate to the field of systems and methods for optical fiber processing, and more particularly to the field of systems and methods using heat for optical fiber processing.

BACKGROUND

In the manufacture of devices using optical fibers, it is commonly required to heat the fibers in a controlled manner so that they may be spliced, coupled, shaped, annealed, tapered, diffused, expanded, flame polished, cleaned, or stripped of coatings. An electrical discharge is commonly employed for this purpose. This electrical discharge is known in the industry as an "arc." However, according to some sources, a discharge of this current level is not a true arc, but a glow discharge that generates a hot plasma.

The arc is normally formed between the sharply pointed tips of a pair of electrodes, typically made of tungsten and spaced 1 mm to 10 mm apart. Larger electrode spacing is required for splicing multiple fibers at once (fiber ribbons), and for larger diameter fibers. The optical design of some splicers may also require the electrode spacing "gap" to be larger in order to prevent the electrodes from physically occluding the optical path.

The voltage applied to the electrodes may be DC (typically in conjunction with smaller electrode spacing) or AC (which allows a larger spacing between the electrode tips—up to 10 mm or more). The voltage required to initiate the discharge is determined by Paschen's Law, which relates the breakdown voltage of a gap between electrodes to a (complex and non-linear) function of the gas present in the gap (typically ordinary air), pressure, humidity, electrode shape, electrode material, and gap distance. Many of the parameters required to apply Paschen's Law to this system are not known, so little quantitative theoretical analysis of splicer arcs has been done. Typically, the initiating voltage is determined experimentally to be in the range of 5 kV to 30 kV.

FIG. 1 shows a schematic representation of a typical prior art fiber processing device using an electrical discharge as a heat source, known as a "fusion splicer". This device has as its primary purpose the splicing of two fiber ends together, but may also be used for other operations, such as tapering. The two fiber ends are held by fixtures (3,4) which can be positioned in at least two axes each. An Arc Discharging Unit (5) provides controlled high voltage to two pointed tungsten alloy electrodes (1,2). A programmable control unit (6) positions the fibers and controls the operation of the Arc Discharging Unit. Typically, these mechanisms are used in conjunction with one or more cameras and associated optics (not shown) to locate the fibers for positioning and to analyze the resulting splice quality.

Once the arc has been initiated, sustained ionization of the plasma in the discharge requires a lower voltage than initially applied. The impedance (ratio of applied voltage to current) of the plasma as a circuit element is difficult to predict. Splicer arcs are even suspected to exhibit negative incremental impedance at some frequencies and current levels. These characteristics make "constant voltage" operation of a splicer arc very difficult to achieve. Therefore, most such systems are controlled to provide a constant average current. This correlates in a reasonably predictable way with the observed power delivered to the discharge and the resulting temperature of the fibers.

However, the accuracy, precision, and repeatability of such control methods is subject to many uncontrolled factors. Air pressure, humidity, air temperature, electrode spacing, electrode cleanliness, and electrode geometry produce unacceptably large changes in the temperature reached at the working surface of the fibers. The electrodes oxidize away during use, which expands the gap between the electrodes, blunts their points, and contaminates their emitting surfaces.

As a result, various procedures have been developed to renormalize the relationship between the setpoint arc current and the resulting fiber temperature. These procedures normally consist of an "arc check" wherein the arc discharge is operated at various power levels, and the resulting distortion or incandescence of the fibers is observed by a camera to provide information used to recalibrate the system for atmospheric and electrode conditions. These procedures are unsatisfactory in many respects, as they consume time, electrode life, and optical fiber, while providing only a temporary and partial solution to the problem of changes in the fiber temperature.

SUMMARY

In accordance with one aspect of the present disclosure, provided is an optical fiber processing system. The system comprises at least two electrodes; at least one fiber holder configured to hold an optical fiber; an airtight enclosure providing a partial vacuum, within which the at least two electrodes are disposed such that a portion of the optical fiber is maintained between the at least two electrodes within the airtight enclosure; and an arc discharging unit configured to selectively control a drive current supplied to the at least two electrodes to control a discharge region generated by and between the at least two electrodes to heat the portion of the optical fiber.

In various embodiments, the at least two electrodes can be three electrodes.

In various embodiments, the at least two electrodes can be more than three electrodes.

In various embodiments, the system can further comprise a pressure sensor configured to sense a pressure within the airtight enclosure.

In various embodiments, the at least one fiber holder can be at least one multi-axis positioner.

In various embodiments, the system can further comprise a vacuum generating venture configured to generate the partial vacuum within the airtight enclosure.

In accordance with another aspect of the invention, provided is a method of processing an optical fiber. The method comprises providing at least two electrodes, at least two fiber holders configured to hold an optical fiber, an airtight enclosure providing a partial vacuum, within which the at least two electrodes are disposed such that a portion of the optical fiber is maintained between the at least two electrodes within the airtight enclosure; and using an arc discharging unit, selectively controlling a drive current supplied to the at least two electrodes to control a discharge region generated by and between the at least two electrodes to heat the portion of the optical fiber.

In various embodiments, the at least two electrodes can be three electrodes.

In various embodiments, the at least two electrodes can be more than three electrodes.

In various embodiments, the method can further comprise sensing a pressure within the airtight enclosure.

In various embodiments, the method can further comprise generating a vacuum within the airtight enclosure.

In accordance with another aspect of the invention provided is a workpiece processing system. The system comprises at least two electrodes; a workpiece holder configured to hold a workpiece; an airtight enclosure providing a partial vacuum, within which the at least two electrodes are disposed such that a portion of the workpiece is maintained between the at least two electrodes within the airtight enclosure; an arc discharging unit configured to selectively control a drive current supplied to the at least two electrodes to control a discharge region generated by and between the at least two electrodes to heat the portion of the workpiece; a pressure sensor configured to sense a pressure within the airtight enclosure; and a vacuum generating venture configured to generate the partial vacuum within the airtight enclosure.

In various embodiments, the at least two electrodes can be three electrodes.

In various embodiments, the at least two electrodes can be more than three electrodes.

In various embodiments, the at least one workpiece holder can be at least one multi-axis positioner.

In various embodiments, the workpiece can be at least one fiber.

In various embodiments, the at least one fiber can be a small diameter fiber.

In various embodiments, the at least one fiber can be a large diameter fiber.

In various embodiments, the at least one fiber can be more than one fiber.

In various embodiments, provide can be a device as described in the figures.

In various embodiments, provide can be a system as described in the figures.

In various embodiments, provide can be a method as described in the figures.

BRIEF DESCRIPTION OF THE DRAWINGS

The present invention will become more apparent in view of the attached drawings and accompanying detailed description. The embodiments depicted therein are provided by way of example, not by way of limitation, wherein like reference numerals refer to the same or similar elements. The drawings are not necessarily to scale, emphasis instead being placed upon illustrating aspects of the invention. In the drawings.

DETAILED DESCRIPTION

Figure 1:
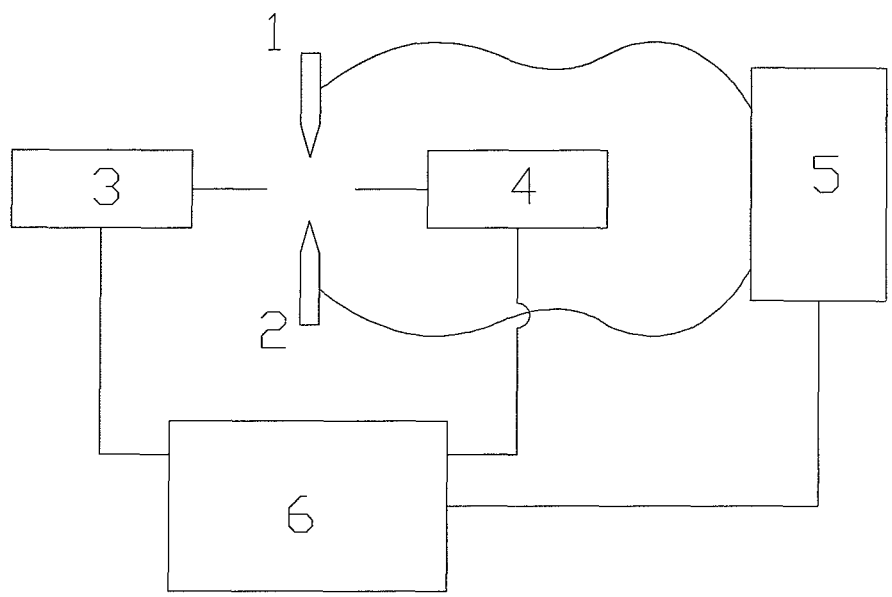
FIG. 1 shows a schematic representation of a typical prior art optical fiber processing device using an electrical discharge as a heat source, known as a "fusion splicer;"

Various exemplary embodiments will be described more fully hereinafter with reference to the accompanying drawings, in which some exemplary embodiments are shown. The present inventive concept may, however, be embodied in many different forms and should not be construed as limited to the exemplary embodiments set forth herein.

It will be understood that, although the terms first, second, etc. are be used herein to describe various elements, these elements should not be limited by these terms. These terms are used to distinguish one element from another, but not to imply a required sequence of elements. For example, a first element can be termed a second element, and, similarly, a second element can be termed a first element, without departing from the scope of the present invention. As used herein, the term "and/or" includes any and all combinations of one or more of the associated listed items.

It will be understood that when an element is referred to as being "on" or "connected" or "coupled" to another element, it can be directly on or connected or coupled to the other element or intervening elements can be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements, and/or components, but do not preclude the presence or addition of one or more other features, steps, operations, elements, components, and/or groups thereof.

Spatially relative terms, such as "beneath," "below," "lower," "above," "upper" and the like may be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as "below" and/or "beneath" other elements or features would then be oriented "above" the other elements or features. The device may be otherwise oriented (e.g., rotated 90 degrees or at other orientations) and the spatially relative descriptors used herein interpreted accordingly.

In accordance with the inventive concept, provided are a system and method where an arc is formed between two or more electrodes in at least a partial vacuum, where control of the vacuum provides a heating limit irrespective of other parameters that would otherwise affect the heating temperature.

A glow discharge ("arc") comprises a flow of electric current through ionized air. The current is primarily transmitted by ions of nitrogen and oxygen, and to a much lesser extent, other atmospheric gasses. As the current provided to the discharge increases, an increased proportion of the air molecules along the path between the electrode tips become ionized, increasing the energy density and the resulting fiber temperature. Eventually, the molecules available along the most direct path all become ionized, and the impedance of the discharge becomes very low. Further increases in drive current cannot increase the energy density directly in the gap between the electrodes, and so the volume of the discharge expands instead. However, this normally occurs only at energy densities which produce temperatures much higher than is useful for processing most optical fibers. Therefore, all prior art arc discharges for fiber processing are operated well below this saturation point.

Figure 2:
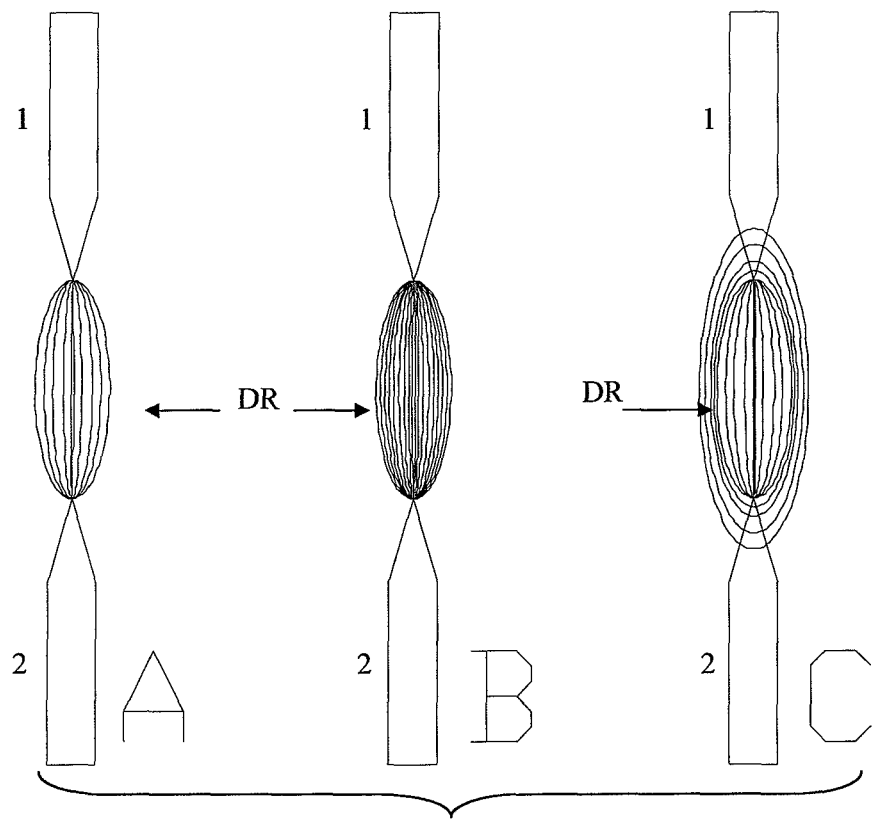
FIG. 2 illustrates the effect of current and pressure on the distribution of energy within the arc discharge region DR, between two electrodes, of an optical fiber processing device providing a partial vacuum, in accordance with aspects of the invention.

FIG. 2 illustrates the effect of current and pressure on the distribution of energy within the arc discharge region DR, between two electrodes 1, 2. FIG. 2A shows an arc discharge at moderate power at normal atmospheric pressure. FIG. 2B shows the result of increasing the drive current while maintaining the same pressure—the discharge region DR is well below saturation, so the energy density increases with only a small expansion of the size of the discharge region DR. In FIG. 2C, the drive current is at the same increased level, but the pressure has been reduced. Since at this pressure the discharge region DR is saturated with current, the energy density remains constant and the discharge region DR expands proportionally. The expansion is in the proportion that the cross sectional area of the discharge, perpendicular to the current flow, is linearly proportional to the drive current.

When the ambient atmospheric pressure in which the discharge occurs is reduced, fewer air molecules per volume are available to be ionized and serve as charge carriers. Therefore, the maximum energy density and resulting maximum temperature are lower and are reached at a lower level of drive current. By controlling the air pressure in the arc region, an upper limit to the fiber temperature is established. The arc drive electronics need only provide sufficient current to saturate the available ionizable air molecules at the chosen pressure. The fiber temperature becomes almost completely insensitive to the condition, spacing, and geometry of the electrodes 1,2, as well as to any deficiencies in the accuracy of the current control of the arc drive electronics. The discharge current (provided that it is greater than the saturation current of the gap between the electrodes) controls only the volume of the arc discharge, not its temperature. Most fiber processing operations, such as splicing, are far more sensitive to temperature than to the area of the heated surface, so this produces more stable results than prior art methods. The arc current may still be varied as required to produce a larger or smaller discharge volume, as may suit the requirements of the application for which the arc is being used, e.g., splicing, tapering, stripping, lensing, and so on.

In a test of a prototype device embodying the invention, the arc discharge was adjusted to the full drive current capability of the device. At standard pressure this current results in temperatures and energy densities sufficient to rapidly boil silica fiber to vapor (>2230° C.), even for large fibers of 1 mm diameter. The air pressure was adjusted to approximately 0.1 atm. A 10 µm silica fiber was placed in the discharge. It was found that the resulting temperature (estimated at 1200° C.) was just sufficient to allow the fiber to be inelastically deformed by an applied force over several seconds. Reduction of the applied current by approximately 80% greatly reduced the area of the discharge, but the deformation rate of the fiber within the discharge region was unchanged, in accordance with the theory underlying the invention.

In a device embodying the invention, the temperature applied to the fibers is almost purely a function of the absolute pressure within the enclosure. This pressure can be sensed and controlled by well-known means within very tight limits. This eliminates the need for "arc check" functions and provides a highly stable, repeatable temperature for the process. Furthermore, little or no change to the pressure level is required for fibers of differing diameters. Since the heat zone ionization potential is entirely saturated, the desired energy density and temperature will remain substantially constant, with the addition of a larger or smaller mass of fiber having little effect. Control of the pressure can be maintained with much greater precision, accuracy, and repeatability than control of current and/or voltage of the complex waveforms of a typical arc discharging unit.

To implement the invention, the working area of the arc discharge and fibers (or other workpiece) is enclosed in a structure that can be evacuated to the required reduced pressure while still allowing access for the fiber, fibers, or other workpiece, as well as any accompanying positioners, fixtures, cameras, optics, illumination, and so forth. A variety of configurations are possible and will be apparent to one skilled in the art.

In one configuration, an entire splicer or other device could be disposed within the vacuum chamber. In another possible configuration, only the immediate volume surrounding the arc discharge may be enclosed, e.g., with bellows or other devices allowing positioners to move the fibers and windows provided for an optical system if required. In yet another configuration, the positioners and optics may be enclosed, with the electronic control mechanisms located outside the enclosure. A wide variety of devices to allow pressure-tight access for wires, optical paths, and mechanical mechanisms are known and may be used to enable any of a variety of particular configurations. All of these possible configurations embody the present invention and may be selected according to other requirements of the use to which the invention may be put.

The enclosure for the arc discharge region, of whatever configuration, must have provisions for maintaining a stable absolute pressure at the required level. The air may be evacuated by a pump or venturi device, as examples. A pressure sensor would be provided to detect the pressure level and control the pump or air flow to the venture as required.

The absolute pressures of interest are typically in the range of 0.05 atm to 0.9 atm (0.7-13.2 psi absolute/38-684 torr). This is well above the pressures at which X-ray production from the electrical discharge would become a danger, or at which standard lubricants and materials for mechanical motion cease to function well.

It will be seen that it is also possible to provide for replacing the remaining air within the enclosure with other gases. For example, an inert gas, such as argon, may be used. This would have the benefit of displacing any humidity present in the air, as well as preventing oxidation of the tungsten electrodes. Other gases may also be used for various desired effects, while remaining within the scope of the invention.

The number of electrodes generating the arc discharge is not limited to two. Three or more electrodes, driven by appropriate multi-phase drive circuits can be employed, as in the 3sae Technologies Inc. "Ring of Fire" technology. (See, e.g., U.S. Pat. No. 7,670,065, U.S. Pat. No. 7,922,400, U.S. Pat. No. 7,985,029, and US Pat. Pub. 2011-0277511, each of which is incorporated herein by reference in its entirety).

When the arc discharge is operated at the saturation point, it is no longer necessary to provide sharply pointed electrodes. The electrodes can be made with flat or spherical ends. Alternatively, the electrodes can be made "T" shaped and have "arms" extended along axes parallel with the axis of the fiber. The discharge region can thereby be shaped to provide a heating zone that extends along the axis of the fiber for several millimeters. If three electrodes are used, the discharge forms a "tunnel" in the form of an open-ended triangular prism, heating the fiber evenly around its circumference and for a substantial length along its axis. This provides substantial advantages in fiber tapering and diffusion operations. It will be realized by one skilled in the art that a wide variety of interchangeable electrode configurations can be provided to shape the heating zone according to differing operational requirements. All of these possibilities are enabled by the method of arc discharge in partial vacuum and are embodiments of the present invention.

Several additional advantages are also obtained by operation of the arc in partial vacuum. By increasing the drive current beyond the saturation point, the discharge can be expanded to cover a much wider area of the fiber than is possible with prior art arc discharge devices or even with filament heaters. This is advantageous in splicing many fibers, as well as for tapering, dopant diffusion, annealing, and other operations. Since atmospheric pressure is directly controlled, it is no longer an uncontrolled variable affecting delivered temperature. Furthermore, sensitivity to humidity and air temperature is reduced to the point of negligibility. Also, air currents from convection within the enclosure are minimized and air currents from external drafts or wind are eliminated entirely.

Another advantage is that the decreased partial pressure of oxygen greatly reduces oxidation of the electrodes as they become heated. This increases electrode life and reduces deposition of tungsten oxide on the fibers or other workpieces.

Yet another advantage is that the arc discharge becomes much easier to initiate. At standard atmospheric pressure, special electronic techniques (known in the art) must be used to ensure that the relatively high initiating voltage is reached to start the arc. This initial high voltage requires heavy insulation of the output transformers and output wiring of the arc discharge electronics. Paschen's Law states that the initiating voltage is proportional to absolute air pressure as $V \approx P/\ln(P)$. Therefore, reduced pressure (for pressures 0.01 atm<P<1 atm) requires a lower initiating voltage, with subsequently reduced requirements for insulation. The requirements for a sharp, precisely shaped point on the electrodes are also eased or eliminated at lower pressures.

Still another advantage is that any gases or fumes produced by the heating operation are contained within the vacuum enclosure and exhausted by the vacuum pump or venture, if provided. They may be readily vented or captured as required by safety and environmental regulations and requirements.

Although the uses of the arc discharge in partial vacuum are described herein as they apply to the processing of optical fibers, it will be recognized that the present invention has much broader applicability. In many cases wherein a glow discharge is used to as a heat source, this same method or an equivalent will provide the same or similar benefits.

A variation of the process is to operate the arc discharge at elevated pressure (above 1 atm absolute). This foregoes many of the advantages of the normal use of the invention, but does allow for higher energy density and temperature to be reached if required. This increased temperature is suitable, for example, for performing splicing or other operations on sapphire (Al2O3) fibers and optical waveguides.

By operating the arc discharge at elevated pressure, but at current levels below the threshold of ion saturation, the arc discharge can be made at lower temperatures, but within a very compact and narrow volume. This method can be used when it is desired to heat only a very small region of a fiber or other workpiece. An application of this modified process would be to heat small regions of a fiber at regularly spaced intervals along its axis in order to create an optical grating.

An apparatus suitable for implementation of the reduced pressure method can be readily adapted to be operated in an elevated pressure mode as well.

Figure 3:
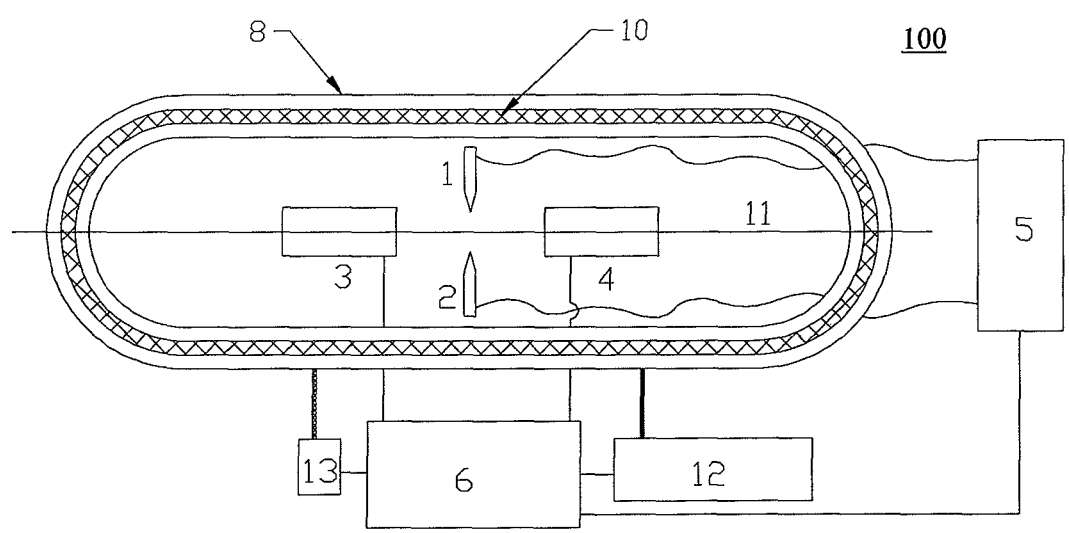
FIG. 3 illustrates, in schematic form, an embodiment of an optical fiber processing device providing a partial vacuum, in accordance with aspects of the invention.

FIG. 3 illustrates in schematic form a preferred embodiment of an optical fiber processing device 100 providing a partial vacuum, according to aspects of the invention. An airtight enclosure 8 is provided to house two multi-axis positioning mechanisms 3,4 and the arc discharging electrodes 1,2. Cameras and optics, not shown, can also be provided within the enclosure to observe the positioning of the fibers. The fiber 11 (which can be a single piece, or two pieces in the process of being spliced together) extends into the enclosure from outside. The fiber 11 is at least one fiber, and could include more than one fiber or fiber ribbon. A flexible seal 10 prevents ingress of air around the fiber. A programmable control mechanism 6, which can be a computer and/or a dedicated microcontroller board, controls the operation of the device. A vacuum-generating venture 12 is coupled to the enclosure by a tube to evacuate the air. An absolute pressure sensor 13 detects the pressure level within the enclosure.

The electrodes 1,2 can be constructed so that they may readily be interchanged with electrodes of different shapes as desired. In addition, an arc discharging unit 5 has provisions for driving a third electrode (not shown) which may be readily added for "Ring of Fire" (three-phase) operation, discussed above.

Figure 4:
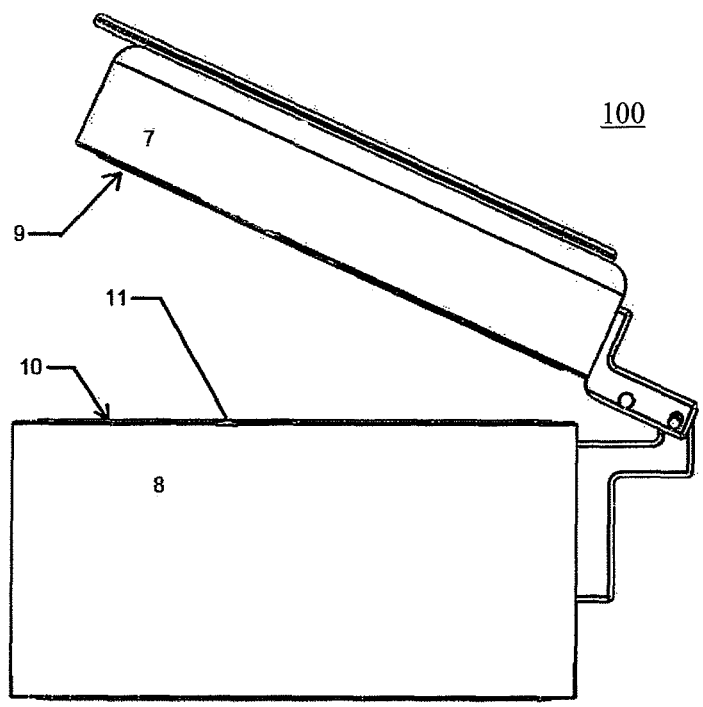
FIG. 4 shows another view of an embodiment of an optical fiber processing device providing a partial vacuum, in accordance with the invention.

FIG. 4 shows another view of an embodiment of an optical fiber processing device providing a partial vacuum 100, in accordance with the invention. The top surface of the enclosure can be closed by a movable lid 7 having a flexible seal 9, which mates with the flexible seal 10 in the bottom portion of the enclosure 8, so as to seal around the fiber 11. To load and remove the fibers, or to make adjustments to the interior mechanisms, the lid 7 can be readily lifted to an upper position. When the lid is lowered and the enclosure is evacuated, air pressure forces the lid tightly against the lower portion of the enclosure 8, deforming the seals (e.g., O-rings) 9,10 so as to seal tightly around the fiber.

Figure 5:
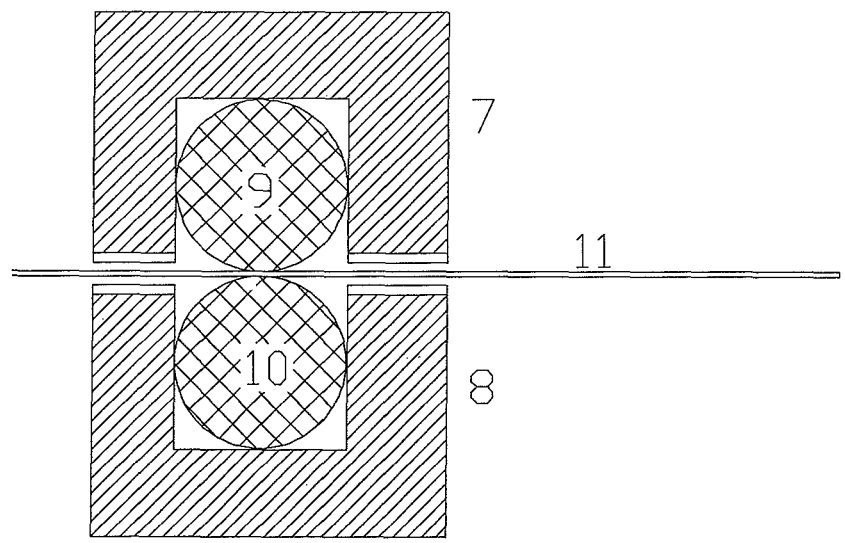
FIG. 5 shows an expanded cross section of an embodiment of the flexible seal mechanism.

FIG. 5 shows an expanded cross section of an embodiment of the flexible seal mechanism. The flexible seals 9,10 are o-rings in this embodiment contained within grooves machined into the aluminum enclosure 8 and enclosure lid 7.

The various positioning mechanisms, optics, and electronics of the preferred embodiment are not dissimilar to others well known in the art. The present invention is embodied in the airtight enclosure and provisions for maintaining a controlled partial vacuum in the area where the arc discharge occurs. The operator, an engineer providing programmed processes for the operator, or an automated feature realized by the control unit 6 selects according to empirically determined data an absolute pressure corresponding to the desired temperature to be applied to the fibers or other workpiece. The arc discharging unit 5 need only be controlled so as to provide a current sufficient to saturate the ionization of the arc discharge region for the installed electrode configuration. If desired, the current can be further increased to expand the heating zone. Because of the benefits of the present invention, the temperature applied to the workpiece can be expected to remain constant over time, electrode condition changes, and on other units of the machine embodying the invention.

While the foregoing has described what are considered to be the best mode and/or other preferred embodiments, it is understood that various modifications can be made therein and that the invention or inventions may be implemented in various forms and embodiments, and that they may be applied in numerous applications, only some of which have been described herein. It is intended by the following claims to claim that which is literally described and all equivalents thereto, including all modifications and variations that fall within the scope of each claim.

What is claimed is:

1. A method, comprising:
   providing a gas-filled chamber having disposed therein at least two electrodes;
   positioning at least one optical fiber in a gap between the at least two electrodes;
   establishing an arc discharge in the gap between the at least two electrodes, thereby producing a heat zone in the gap, including ionizing the gas within the heat zone so that the arc discharge reaches saturation for a chosen gas pressure; and
   controlling an upper temperature limit within the heat zone by controlling a gas pressure within the chamber.

2. The method of claim 1, wherein ionizing the gas within the heat zone comprises:
   bringing a current level of the arc discharge to at least a saturation level.

3. The method of claim 1, further comprising:
   controlling a volume of the heat zone by selectively controlling a drive current supplied to one or more of at least two electrodes.

4. The method of claim 3, wherein an energy density of the arc discharge remains substantially the same at different volumes of the heat zone.

5. The method of claim 1, further comprising:
   generating at least a partial vacuum within the gas-filled chamber.

6. The method of claim 1, wherein the at least two electrodes is at least three electrodes.

7. The method of claim 1, wherein the processing comprises:
   splicing at least two optical fibers the heat zone.

8. The method of claim 1, wherein the processing comprises at least one of: tapering the at least one optical fiber the heat zone; annealing the at least one optical fiber in the heat zone; stripping the at least one optical fiber in the heat zone; or lensing the at least one optical fiber in the heat zone.

9. The method of claim 1, wherein the chamber is an airtight chamber.

10. An apparatus, comprising:
    a chamber configured to maintain a gas;
    a plurality of electrodes within the chamber and arranged to generate an arc discharge in a gap between the at least two electrodes to establish a heat zone in the gap;
    at least one fiber holder configured to maintain a portion of at least one optical fiber in the heat zone;
    an arc discharge unit configured to supply a drive current to the at least two electrodes at a level sufficient to ionize the arc discharge to saturation for a chosen gas pressure; and
    a controller configured to control a gas pressure within the chamber to responsively control an upper temperature limit within the heat zone when the arc discharge is ionized to saturation.

11. The apparatus of claim 10, wherein the arc discharge unit is further configured to selectively control the drive current supplied to one or more of at least two electrodes, above saturation, to control a volume of the heat zone,
    wherein an energy density of the arc discharge remains substantially the same at different volumes of the heat zone.

12. The apparatus of claim 10, further comprising:
    a venturi that generates a partial vacuum within the chamber.

13. The apparatus of claim 10, wherein the at least two electrodes is at least three electrodes.

14. The apparatus of claim 10, further comprising:
    a positioner system configured to position the at least one optical fiber within the heat zone for processing.

15. The apparatus of claim 14, wherein the apparatus is configured to splice at least two optical fibers in the heat zone.

16. The apparatus of claim 14, wherein apparatus is configured to:
    taper the at least one optical fiber the heat zone;
    anneal the at least one optical fiber in the heat zone;
    strip the at least one optical fiber in the heat zone; or
    lense the at least one optical fiber in the heat zone.

17. The apparatus of claim 14, wherein the positioner is a multi-axis positioner.

18. The apparatus of claim 10, further comprising:
    a pressure sensor coupled to the controller and arranged to sense a gas pressure within the chamber.

19. The apparatus of claim 10, wherein the chamber is an airtight chamber.

20. The apparatus of claim 19, further comprising:
    a flexible seal that enables ingress and egress of the at least one optical fiber.

21. The apparatus of claim 19, wherein the chamber comprises:
    an enclosure;
    a lid configured to open and close the enclosure; and
    at least one airtight seal between the lid and the enclosure.

22. A workpiece processing system, comprising:
    an airtight chamber configured to maintain a gas in at least a partial vacuum;
    a plurality of electrodes within the chamber and arranged to generate an arc discharge in a gap between the at least two electrodes to establish a heat zone in the gap;
    a positioner system configured to position at least one workpiece within the heat zone for processing;
    an arc discharge unit configured to supply a drive current to the at least two electrodes at a level sufficient to ionize the arc discharge to saturation for a chosen gas pressure;

a pressure sensor arranged to sense a gas pressure within the chamber; and a controller coupled to the pressure sensor and configured to control a gas pressure within the chamber to responsively control an upper temperature limit within the heat zone;

a vacuum generating venturi configured to generate the partial vacuum within the airtight enclosure and to control the pressure to thereby establish an upper limit of the temperature applied to the workpiece.

23. The system of claim 22, wherein the at least two electrodes is at least three electrodes.

24. The system of claim 22, wherein the workpiece holder is at least one multi-axis positioner.

25. The system of claim 22, wherein the workpiece is at least one optical fiber.

26. The system of claim 25, wherein the system is configured to splice at least two optical fibers in the heat zone.

27. The system of claim 25, wherein system is configured to:
taper the at least one optical fiber the heat zone;
anneal the at least one optical fiber in the heat zone;
strip the at least one optical fiber in the heat zone; or
lense the at least one optical fiber in the heat zone.

* * * * *

UNITED STATES PATENT AND TRADEMARK OFFICE
CERTIFICATE OF CORRECTION

PATENT NO.          : 9,554,420 B2                                              Page 1 of 1
APPLICATION NO.     : 14/388292
DATED               : January 24, 2017
INVENTOR(S)         : Robert G. Wiley et al.

It is certified that error appears in the above-identified patent and that said Letters Patent is hereby corrected as shown below:

In the Claims
Column 9, Line 60, after the word "fibers" and before the word "the", please insert the word --in--.
Column 10, Line 36, after the word "fiber" and before the word "the", please insert the word --in--.
Column 11, Line 19, after the word "wherein" and before the word "system", please insert the word --the--.
Column 11, Line 21, after the word "fiber" and before the word "the", please insert the word --in--.

Signed and Sealed this
Sixteenth Day of May, 2017

Michelle K. Lee
*Director of the United States Patent and Trademark Office*